United States Patent [19]

Forster et al.

[11] Patent Number: 4,842,878
[45] Date of Patent: Jun. 27, 1989

[54] PROCESS FOR THE EXTRACTION OF NONPOLAR CONSTITUENTS OF HOPS

[75] Inventors: Adrian Forster; Stefan Geyer; Josef Schulmeyr; Roland Schmidt; Manfred Gehrig, all of Wolnzach, Fed. Rep. of Germany

[73] Assignee: Hopfen-Extraktion HVG Barth, Raiser & Co., Wolnzach, Fed. Rep. of Germany

[21] Appl. No.: 100,798

[22] Filed: Sep. 24, 1987

[30] Foreign Application Priority Data

Sep. 24, 1986 [DE] Fed. Rep. of Germany ....... 3632401

[51] Int. Cl.$^4$ ................................................. C12C 3/00
[52] U.S. Cl. ...................................... 426/286; 426/422; 426/429; 426/600
[58] Field of Search ............... 426/600, 532, 422, 423, 426/424, 425, 429, 271, 534, 472, 474, 286; 210/684, 638

[56] References Cited

U.S. PATENT DOCUMENTS

| | | | |
|---|---|---|---|
| 4,049,834 | 9/1977 | Barwald et al. | 426/600 |
| 4,212,895 | 7/1980 | Laws et al. | 426/600 |
| 4,218,491 | 8/1980 | Laws et al. | 426/600 |
| 4,282,259 | 8/1981 | Wheldon et al. | 426/425 |
| 4,298,626 | 11/1981 | Laws et al. | 426/600 |
| 4,338,348 | 7/1982 | Muller | 426/600 |
| 4,511,508 | 4/1985 | Vollbracht et al. | 426/600 |
| 4,721,624 | 1/1988 | Schumann | 426/271 |

OTHER PUBLICATIONS

FST Abstracts 80-11-H1654 Krueger Use of Carbon Dioxide in the Manufacture of Hop Products Monatsschrift für Brauerei 33(3), 104–110, (1980), Abstract only.

*Primary Examiner*—Donald E. Czaja
*Assistant Examiner*—Carolyn Paden
*Attorney, Agent, or Firm*—Jordan and Hamburg

[57] ABSTRACT

The invention relates to a process for extracting nonpolar constituents from hops with simultaneous separation of residues of nonpolar plant protectives. In a first step the plant protective as well as other ingredients that are soluble under the chosen conditions are extracted with compressed gases, and in a subsequent stage the dissolved mixture is passed through an adsorbent and the plant protective is selectively removed from the mixture.

14 Claims, No Drawings

PROCESS FOR THE EXTRACTION OF NONPOLAR CONSTITUENTS OF HOPS

BACKGROUND OF THE INVENTION

The invention is addressed to a process for the extraction of nonpolar constituents from natural substances including hops with the simultaneous separation of the residues of nonpolar plant protecting agents. The hop plant is named in this connection only by way of example, since the problem of removing undesirable residues occurs in numerous natural substances, whether the starting substances are cultivated or wild.

The constituents which determine the value of hops are the hop resins and hop oils. The most important hop resins, the α- and β-picric acids, as well as the other soft resins, are of a nonpolar, lypophilic character, and so are the terpenes and sesquiterpenes of hop oil. Since all these substances are relatively unstable there are many possibilities for separating and concentrating the important constituents of vegetable matter by extraction with suitable solvents (on the state of the art, see for example SANDER, W. and DRUBLEIN, B., in Brau-Industrie 1982, p. 997).

Such extractants are organic solvents, especially dichloromethane, hexane, methanol, or ethanol. Recently, the extraction of hops with highly compressed $CO_2$ has been described. In the process according to German Federal Pat. No. 21 27 618, $CO_2$ at supercritical pressure and temperature is used as the extractant. The separation of the desired substances from the solvent is then performed by reducing the density by lowering the pressure with simultaneous evaporation of the $CO_2$. The $CO_2$ extracts thus obtained are regarded in the industrial field as especially pure and stable.

Hops are treated during their growing season from March to August with numerous plant protectives which ultimately always lead, regardless of their form, to residues, even though sometimes in minute amounts. In the Federal Republic about 40 plant protectives are presently approved for hop growing.

The residues of these plant protectives are understandably undesirable in every case, as is underlined by their intensive public discussion. Raw materials for beer-making are especially subject to critical evaluation, since beer has proven, on account of the demand for purity, to be a very sensitive food substance. Consequently, it would be considered advantageous if it were possible to produce hops and hop products of very low residue content.

It is already possible to reduce the amount of residues that occur by developing and growing disease-resistant types of hops, but freedom from residues is an unattained goal. A partial reduction can also be achieved by solvent extraction. The more selective a solvent is, the fewer are the residues that can be extracted. Results have been published on dithiocarbamate residues, for example, in Brauwelt, 1981, 825 (Nitz, S. et al.), and on heavy metals in Brauerei-Rundschau, vol. 92, July 1981, No. 7 (Schur, F. et al.). Even though it is to be assumed that the very selective and nonpolar solvent carbon dioxide has the advantage over ethanol, for example, that it does not dissolve plant protectives of a polar nature, there are a number of nonpolar protectives which can be dissolved out of the plants by $CO_2$ extraction. For example, in Planta medica No. 2, April 1984, pp. 171-173, there is a report on the possibility of removing plant protectives from drugs with supercritical carbon dioxide. DDT and hexachlorocyclohexane as lypophilic constituents are extracted at relatively low pressures (80-120 bar) from drugs whose value-determining substances are extracted only at higher pressures (above 150 bar), or which have, so to speak, a polar character whereby they are indissoluble in $CO_2$. The authors come to the conclusion that the process described is applicable only to plants which do not contain lipophilic substances such as ethereal oils, for example.

However the substances obtained from hops are lypophilic, and thus the process described in Planta medica is not applicable to hops.

Attempts to reduce residue content have been performed with three important representatives of plant protectives;

1. Folpet (N-(trichloromethylthio)-phthalimide) and
2. Metalaxyl (D,L-N-2,6-dimethylphenyl-N-(2'-methoxyacetyl)alanine methyl ester)

as fungicides, and

3. Endosulfan (6,7,8,9,10,10-hexachloro-1,5,5a,6,9,9a-hexahydro-6,9-methano-2,4,3-benzodioxathiepin 3-oxide)

as an insecticide.

Studies with folpet insecticide (N-(trichloromethylthio)phthalimide), which is used preferentially against fungus infections by Peronospora, Phomapsis, Fusicladium, Botrytis etc., have shown that, under all conditions known heretofore, both in the liquid range (e.g., 70 bar, 15° C. or 150-300 bar, 25° C.) and in the superoritical range (150-300 bar, 40°-80° C.), extraction with $CO_2$ is successful. Upon the necessary separation, therefore, the extract and the folpet occur together. Decontamination can be performed at 80-100 bar and 60° C. from, for example, 50 ppm in the starting hops, to 0.5 ppm. However, the advantage of the 99% removal of the residue is offset by the disadvantage that about 10 to 20% of the soluble extract goes with it. The separation of this extract containing the folpet leads to a product in which the residue is greatly concentrated, and which must be discarded. The extraction of the active substances from the hops thus decontaminated can then be performed under normal extraction conditions. Therefore, while on the one hand a virtually residue-free extract is produced, on the other hand there is an unacceptable economic disadvantage in the form of the extract produced by the decontamination.

SUMMARY OF THE INVENTION

The need thus exists for a remedy whereby fungicide residues can be separated without at the same time losing uncceptably large amounts of hop extract. A virtually complete removal of the fungicides is the object. This is achieved by the present invention, in a process of the kind referred to above, in that, in a first step of the process, the plant protective as well as other constituents which are soluble under selected conditions are extracted from natural substances with compressed gases, and in a subsequent step the dissolved mixture is passed through an adsorbent and the plant protective is removed selectively from the mixture. Thus, in the first step the extractant, especially $CO_2$, is pumped through the batch of hops, and the residues of plant protectives adhering to the hops—folpet in the case of the example studied—are dissolved along with an appreciable amount of hop oils and resins. In a subsequent second step, the mixture of hop constituents and plant protectives dissolved in the first step is transferred to an autoclave that contains the adsorbent, which then binds the plant protective and retains it, while having no adsorbing action on the resins and oils of the hops. For example, the plant protective may be extracted at a low density of the solvent at a pressure between 70 and 120 bar and temperatures between 40° C. and 80° C.

DETAILED DESCRIPTION OF THE PREFERRED EMBODIMENTS

The following table shows the adsorbing action of a number of adsorbents for folpet, and for the extracted valuable substances of the hops.

| Adsorbent | Adsorption of | |
|---|---|---|
| | Folpet | Resin and Oil |
| Active charcoal | + | + |
| Kieselgur, coarse | (+) | — |
| Kieselgur, fine | (+) | — |
| Celite 545 | + | — |
| Celite 512 | — | — |
| Silica gel 90 mesh | + | (−) |
| Ion exchanger | — | — |
| Aluminum oxide | + | + |
| Magnesium oxide | + | + |
| Sodium bentonite | + | (−) |
| PVPP (polyvinylpolypyrrolidone) | + | — |

+ Good, quantitative adsorption
(+) Good, but not quantitative adsorption
— No adsorption
(−) Slight adsorption.

Of the agents listed in the table, Celite 545 and PVPP have proven to be well-suited, sodium bentonite, silica gel and kieselgur, less well-suited. The mixture of solvent and extracted substances, freed of the fungicide by adsorption, is separated by density reduction, e.g., by pressure reduction and carbon dioxide evaporation. This can be achieved, for example, at pressures between 40 and 60 bar and temperatures above the vapor pressure curve at which the carbon dioxide solvent is in gaseous form. The $CO_2$ freed from the hop constituents is then liquefied and returned to the extraction circuit. In an especially advantageous manner, the mixture is returned after the adsorption without reducing its pressure, i.e., an isobaric solvent circuit is maintained with a circulating pump. On the one hand, the compression costs are reduced, and on the other hand hop constituents are dissolved only until the solvent is saturated. When the desired plant protectives have been extracted and adsorbed, the adsorption autoclave can be taken out of the circuit and the optimum conditions can be established as they are in a normal extraction. A specifically suitable adsorbent must be found for each plant protective, one which does not act or acts but slightly on the hop constituents. The "adsorbent" can consist also of one or more agents, and a succession of several agents or a mixture is conceivable. It is also to be noted that an optimum temperature range is to be established for each adsorbent so as to prevent any possible desorption, i.e., the temperature is selected such that the adsorption/desorption equilibrium lies on the adsorption side.

The following comparative examples show the extractability of a nonpolar plant protective, such as folpet, when conventional processing is used. Hops heavily contaminated with 78.9 ppm of folpet were used. The solvents were hexane, dichloromethane, 100% ethanol, a mixture of 10% water and 90% ethanol, and carbon dioxide under three conditions. The following table shows the folpet residues in the spent hops after an exhaustive resin extraction, the folpet contents in the extracts, and, in the last column, the recovery percentages with respect to the 78.9 ppm;

| Extractant | ppm of folpet in spent hops | ppm of folpet in extract | Recovery rate in % relative |
|---|---|---|---|
| Hexane | 1.2 | 533.5 | 82.5 |
| Dichloromethane | n.n. | 429.1 | 76.1 |
| 100% ethanol | n.n. | 386.5 | 68.6 |
| 90% ethanol, 10% water | n.n. | 326.3 | 66.2 |
| $CO_2$/70 bar 15° C. | 3.8 | 635.8 | 95.4 |
| $CO_2$/150 bar 25° C. | 3.8 | 603.5 | 91.2 |
| $CO_2$/220 bar 50° C. | 2.6 | 606.4 | 94.1 |
| $CO_2$/300 bar 50° C. | 1.6 | 653.1 | 97.8 |

In each of these cases tested, an exhaustive extraction of the valuable substances is accompanied by a virtually quantitative extraction of the folpet. The poor folpet recovery rates in the case of the organic solvent extractions indicate a degradation of the fungicide, which can differ in degree depending on the thermal stress during the concentration by evaporation. As it was to be expected, none of the processes is capable of producing extracts specifically only with hop constituents without the fungicide folpet.

The following comparative examples will show what possibility there is of removing the folpet in a first step by the selection of the pressure and temperature of the carbon dioxide, without on the other hand extracting valuable hop resins or oils. Carbon dioxide was pumped for 3 hours at different parameters through hop pellets contaminated with 12.6 ppm of folpet. In the following table the first column shows the residual folpet contained in the pellets after the first extraction. The second column gives the decontamination rates with respect to the initial content, and the third column indicates the relative yields of hop resins and oils, with respect to the initial content, that stay with the folpet.

| Extraction parameters | ppm of folpet in hop pellets | % of folpet removed | Extract yield % relative |
|---|---|---|---|
| 100 bar/20° C. | 0.6 | 95 | 34.3 |
| 100 bar/60° C. | 1.9 | 85 | 19.4 |
| 90 bar/60° C. | 4.8 | 62 | 5.1 |
| 70 bar/40° C. | 8.3 | 34 | 2.5 |

In each case, definitely more folpet than hop resins is taken out in the purification stage. But although in the case of an effective removal of the folpet appreciable amounts of the valuable substances are extracted, which are to be considered as severely contaminated, a virtually quantitative removal of the folpet without dissolving the substances extracted would take uneconomically long and can therefore be considered only where the starting amounts are very low.

It proves to be substantially more advantageous, therefore, to bind the pesticide or pesticides onto an adsorbent without the hop resins and oils. Hop pellets with 12.6 ppm of folpet serve as examples of the process. They are decontaminated in a first step, the folpet is bound to an adsorbent, and the resin and oil content that is necessarily extracted with it is separated by density reduction. It is conceivable to pump $CO_2$ through the hops under normal extraction conditions (i.e., at elevated pressure). This variant proves to be advantageous especially in the case of very low starting data. In any case, however, it is recommendable after removing the pesticide to avoid the adsorption autoclave because to do so can extend the life of the adsorbent. The adsorbent in the present case was added to the batch of hop pellets in a ratio of 1:10. The results, taken together, show that it is possible by the process described to produce folpet-free extracts. The undesirable pesticide remains in the adsorbent without the formation of degradation products.

| Extraction parameters | | Adsorbent in Step 1 | ppm of folpet in total extract | ppm of folpet in the spent hops | Relative extraction yield % | |
|---|---|---|---|---|---|---|
| Step 1 | Step 2 | | | | Step 1 | Step 2 |
| 220/50 | 220/50 | | | | | |
| 1 h | 2 h | kieselgur | 0.5 | not detectable | 63 | 34 |
| 1 h | 2 h | silica gel | 0.3 | not detectable | 64 | 28 |
| 1 h | 2 h | bentonite | 0.2 | not detectable | 61 | 35 |
| 1 h | 2 h | celite 545 | n.n. | not detectable | 66 | 32 |
| 1 h | 2 h | PVPP | n.n. | not detectable | 62 | 31 |
| 100/60 | 220/50 | | | | | |
| 1.5 h | 2.5 h | kieselgur | 0.3 | not detectable | 10 | 88 |
| 1.5 h | 2.5 h | silica gel | 0.2 | not detectable | 14 | 86 |
| 1.5 h | 2.5 h | bentonite | 0.2 | not detectable | 15 | 82 |
| 1.5 h | 2.5 h | celite 545 | n.n. | not detectable | 12 | 87 |
| 1.5 h | 2.5 h | PVPP | n.n. | not detectable | 13 | 87 |

We claim:

1. A process for extracting nonpolar constituents from hops while simultaneously separating residues of nonpolar plant protectives from the hops, comprising, in a first step, extracting the soluble plant protective residue and nonpolar constituents from said hops with a solvent comprising compressed carbon dioxide, under selected temperature and pressure conditions sufficient to extract the soluble plant protective residue and nonpolar constituents from said hops to form a dissolved mixture, and then, in a second step, passing the dissolved mixture through an adsorbent to selectively adsorb the plant protective residue from the mixture.

2. A process according to claim 1, wherein the plant protective residue is extracted at low density of the solvent at pressures between 70 and 120 bar and temperatures between 40° C. and 80° C.

3. A process according to claim 1, wherein the plant protective residue is selectively adsorbed in a subsequent step by a solid adsorbent under the same pressure conditions as the extraction.

4. A process according to claim 1, wherein the plant protective residue is adsorbed at a temperature resulting in an adsorption/desorption equilibrium lying on the adsorption side, thereby preventing any possible desorption.

5. A process according to claim 3, wherein the adsorbent is selected from the group consisting of kieselgur, silica gel, bentonite, polyvinylpolypyrrolidone and mixtures thereof.

6. A process according to claim 1, further comprising repeating the extracting step at least once.

7. A process according to claim 6, wherein a different adsorbent is used in each extracting step.

8. A process according to claim 1, further comprising separating the nonpolar constituents from the dissolved mixture by reducing the density of the mixture after the adsorption step.

9. A process according to claim 8, wherein the nonpolar constituents are separated at a pressure between 40 and 60 bar and a temperature above a carbon dioxide vapor pressure curve, at which the solvent is in gaseous form.

10. A process according to claim 1, wherein the nonpolar constituent are hop oils and resins.

11. A process according to claim 1, wherein the plant protective residue is folpet.

12. A process according to claim 8, further comprising returning the solvent to the extracting step after adsorption and separation of the plant protective residue and nonpolar constituents therefrom.

13. A process according to claim 3 further comprising recycling the solvent to the extracting step under the same pressure conditions as the extraction and adsorption steps.

14. A process according to claim 8, wherein the density is reduced by reducing pressure of the mixture and evaporating carbon dioxide.

* * * * *